United States Patent [19]
Lomas

[11] Patent Number: 6,081,892
[45] Date of Patent: Jun. 27, 2000

[54] INITIAL PROGRAM LOAD

[76] Inventor: Charles Lomas, 122 Laneside Road, New Mills Stockport Cheshire SK12 4LU, United Kingdom

[21] Appl. No.: 09/083,400

[22] Filed: May 22, 1998

[30] Foreign Application Priority Data

Jun. 19, 1997 [GB] United Kingdom .................. 9712799

[51] Int. Cl.⁷ ..................................................... G06F 9/445
[52] U.S. Cl. .................................................. 713/2; 714/36
[58] Field of Search .................................. 713/2; 714/36; 710/10

[56] References Cited

U.S. PATENT DOCUMENTS

| | | | |
|---|---|---|---|
| 5,220,667 | 6/1993 | Ichieda ......................................... | 713/1 |
| 5,450,589 | 9/1995 | Maebayashi et al. .................... | 713/2 X |
| 5,918,047 | 6/1999 | Leavitt et al. ............................... | 713/2 |
| 5,935,242 | 8/1999 | Madany et al. .......................... | 713/2 X |
| 6,003,130 | 12/1999 | Anderson ..................................... | 713/2 |

FOREIGN PATENT DOCUMENTS 0 281 999   9/1988   European Pat. Off. .

OTHER PUBLICATIONS

"Power–On Self–Test Memory Configuration Algorithm for Invalid CMOS/NURAM", IBM Technical Disclosure Bulletin, vol. 37, No. 3, Mar. 1994, pp. 563–565.

"Read–Only Memory Recovery in a System with Initial Microcode Load", IBM Technical Disclosure Bulletin, vol. 37, No. 2B, Feb. 1994, pp. 35–37.

*Primary Examiner*—David L. Robertson
*Attorney, Agent, or Firm*—Lee, Mann, Smith, McWilliams, Sweeney & Ohlson

[57] ABSTRACT

A computer system comprises a main memory and a battery-backed memory (BRAM) for storing configuration information for use in initial program load (IPL). A read-only memory stores a master version of the configuration information. When the system is powered on, an IPL sequence is performed which checks the BRAM, and then, if the contents of the BRAM are valid, copies the control information from the BRAM into the main memory. Alternatively, if the contents of the BRAM are invalid, the IPL sequence copies the master version of the control information from the read-only memory into the BRAM and also into the main memory.

4 Claims, 1 Drawing Sheet

INITIAL PROGRAM LOAD

BACKGROUND TO THE INVENTION

This invention relates to initial program load (IPL) facilities for computers.

It is known to use a battery-backed random access memory (BRAM) to store configuration information for use in IPL. A customer engineer may require to make changes to the configuration stored in the BRAM, for the purposes of testing. However, a problem with this is that the engineer may not be able easily to undo the changes and restore the system to a "clean" state.

The object of the invention is to overcome or alleviate this problem.

SUMMARY OF THE INVENTION

According to the invention a computer system comprises:

(a) a main memory;

(b) a battery-backed memory (BRAM) for storing configuration information for use in initial program load (IPL);

(c) a read-only memory (e.g. an electrically-erasable programmable read-only memory, EEPROM) for storing a master version of the configuration information; and (d) an IPL sequence which, when the system is powered on, checks the BRAM, and then, (i) if the contents of the BRAM are valid, copies the control information from the BRAM into the main memory; and (ii) if the contents of the BRAM are invalid, copies the master version of the control information from the read-only memory into the BRAM and also into the main memory.

It can be seen that, if an engineer makes a change to the BRAM, the change can easily be undone simply by invalidating the BRAM (e.g. by temporarily disconnecting the BRAM from its battery backup), and then performing an IPL. This will automatically restore the master copy of the control information to the BRAM.

DESCRIPTION OF AN EMBODIMENT OF THE INVENTION

One computer system in accordance with the invention will now be described by way of example with reference to the accompanying drawings.

Overall View of the System

Figure 1:
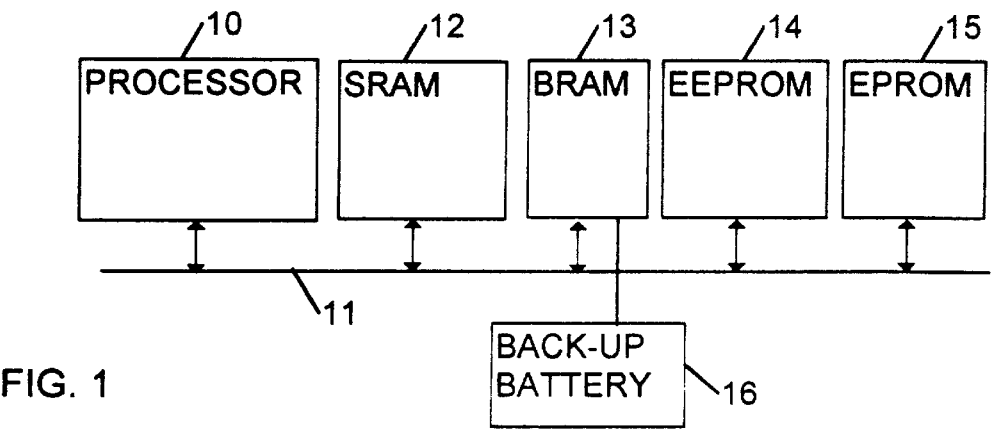
FIG. 1 is a block diagram of a computer system embodying the invention.

Referring to FIG. 1, the computer system comprises a processor 10, connected by a system bus 11 to the following units: a static memory (SRAM) 12, a battery-backed memory (BRAM) 13, an electrically-erasable programmable read-only memory (EEPROM) 14, and an electrically programmable read-only memory (EPROM) 15. The BRAM has a backup battery 16, which is mounted on the system backplane, while the BRAM itself is on a card plugged into the backplane. Hence, the backup power can be removed from the BRAM simply by unplugging the card from the backplane.

The SRAM is the main working memory of the system.

The BRAM holds configuration information for use in IPL. The BRAM also holds a header string and a check sum value, for use in checking the validity of the contents of the BRAM. The configuration information stored in the BRAM includes a control word which contains information specifying various options that are available during IPL. These options may include:

The particular trace mode to be used.

The particular command set to be used.

Whether or not to use device level error management and recovery.

Whether or not to report built-in-self-test (BIST) failures.

Whether or not to freeze the trace area on watchdog timeout restarts.

Whether or not to enable error reporting.

Whether to go to a "not operational" state after a crash dump has been detected, or to ignore the crash dump and restart tracing.

The EEPROM holds a master version of the control word. This may or may not be identical to the instance of the control word held in the BRAM. The EEPROM also holds a header string, a check sum value, an EEPROM Firmware Build version number, and an SRAM Build Version number The EPROM stores firmware routines, including an IPL routine which controls the IPL.

Initial program load

Figure 2:
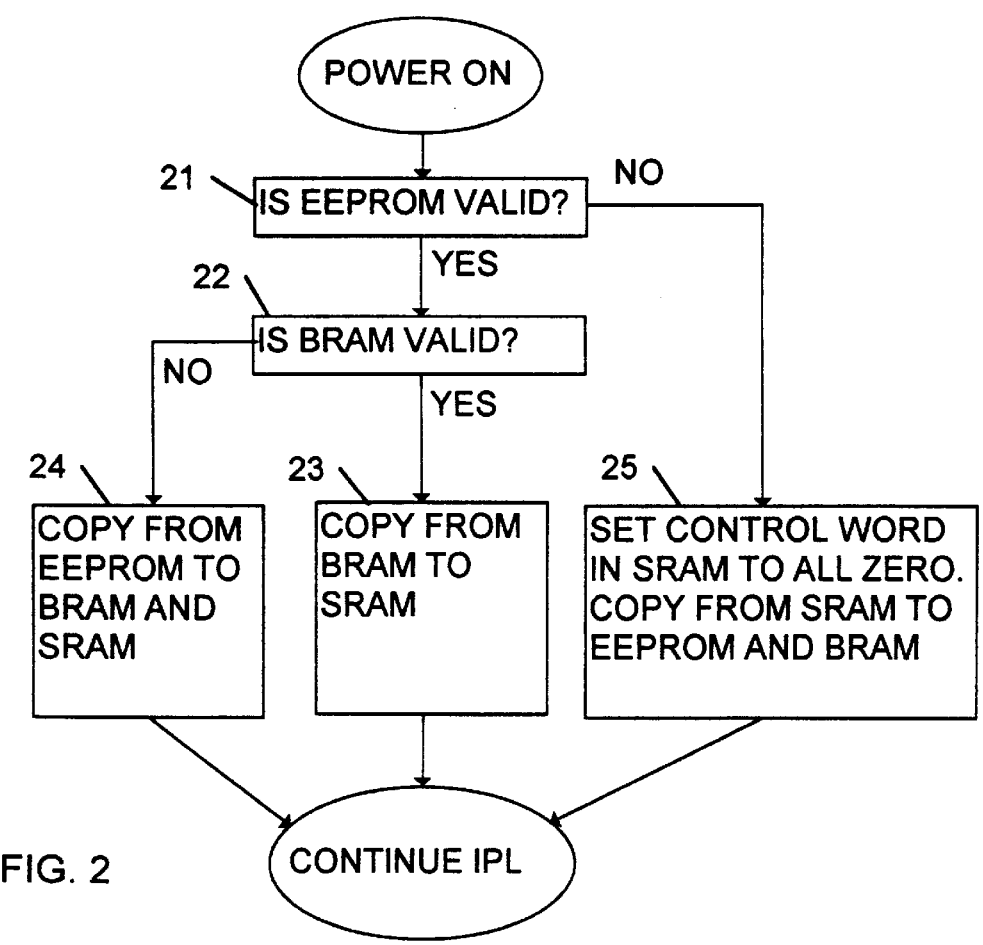
FIG. 2 is a flow chart showing part of an IPL sequence.

The initial stages of IPL, after the system is powered up, will now be described with reference to FIG. 2.

(Step 21) The IPL firmware first checks whether the contents of the EEPROM are valid. The EEPROM is considered valid if the following conditions are all true:

(a) The header string in the EEPROM matches a predetermined check value.

(b) The check sum value in the EEPROM matches the result of a check sum generated over the whole EEPROM.

(c) The EEPROM Firmware Build version number matches the SRAM Build Version number.

(Step 22) If the contents of the EEPROM are valid, the IPL firmware then checks whether the contents of the BRAM are valid, using the header and check sum values in the BRAM.

(Step 23) If the contents of the BRAM are valid, the IPL firmware then copies the control word from the BRAM into the SRAM. The copy in the SRAM is the working copy of the control word.

(Step 24) If the contents of the BRAM are not valid, the IPL firmware copies the master version of the control word from the EEPROM into both the BRAM and the SRAM.

(Step 25) If the contents of the EEPROM are not valid, the IPL firmware sets all the bits of the instance of the control word in the SRAM to a default value of zero. It then copies this instance of the control word from the SRAM into both the BRAM and the EEPROM.

The IPL sequence then continues, using the copy of the control word in the SRAM to control the various IPL options.

Access Permissions

There are three distinct types of user who may require to change the settings of the control word:

(a) development engineers, i.e. those responsible for the design and development of the system;

(b) manufacturing engineers, i.e. those responsible for testing and configuring systems in the factory, before delivery to the customer; and (c) customer engineers, i.e. those responsible for maintaining the system at the customer's site.

Development engineers and manufacturing engineers are given access permission to both the BRAM and the EEPROM. This enables them to change the setting of the control word as required, during testing the system and diagnosis of faults. In addition, development engineers can change the default values of the control word.

Customer engineers are given access permission to the BRAM, but not to the EEPROM. A customer engineer can therefore access the BRAM to change the instance of the control word held in the BRAM. Normally, the customer engineer will only do this under instruction from a manufacturing or development engineer, when standard tracing and reporting does not identify the cause of a particular problem.

The customer engineer can revert back to the original setting of the control word by performing the following sequence of actions:

(i) Power off the system.

(ii) Temporarily remove the backup power from the BRAM. In the present example, this can be performed simply by unplugging the circuit card on which the BRAN is mounted. Removal of the backup power from the BRAM causes its contents to become invalid.

(iii) Power up the system again. The IPL sequence will now detect that the contents of the BRAM are invalid, and so will cause the EEPROM instance of the control word to be copied into both the BRAM and the SRAM.

What is claimed:

1. A computer system comprising:

(a) a main memory;

(b) a battery-backed memory (BRAM) for storing configuration information for use in initial program load (IPL);

(c) a read-only memory for storing a master version of the configuration information; and (d) an IPL sequence which, when the system is powered on, checks the BRAM, and then,
  (i) if the contents of the BRAM are valid, copies the control information from the BRAM into the main memory; and
  (ii) if the contents of the BRAM are invalid, copies the master version of the control information from the read-only memory into the BRAM and also into the main memory.

2. A computer system according to claim 1 wherein said read-only memory is an electrically-erasable programmable read-only memory (EEPROM).

3. A computer system according to claim 2, wherein the IPL sequence also checks the EEPROM and, if the contents of the EEPROM are invalid, sets the instances of the control information in the EEPROM, BRAM and main memory to a default value.

4. A computer system according to claim 1 wherein:

(a) said BRAM is mounted on a printed circuit card which is connected to a backplane, and (b) said backup battery for said BRAM is mounted on the backplane, whereby the BRAM can be disconnected from its battery backup by unplugging the printed circuit card from the backplane.

* * * * *